US012650145B2

(12) United States Patent
Kikuchi et al.

(10) Patent No.: US 12,650,145 B2
(45) Date of Patent: Jun. 9, 2026

(54) COMBINED CONICAL ROLLER BEARING UNIT AND METHOD FOR MANUFACTURING SAME

(71) Applicant: FANUC CORPORATION, Minamitsuru-gun (JP)

(72) Inventors: Kaname Kikuchi, Yamanashi (JP); Toshihiko Inoue, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 27 days.

(21) Appl. No.: 18/579,379

(22) PCT Filed: Sep. 30, 2021

(86) PCT No.: PCT/JP2021/036244
§ 371 (c)(1),
(2) Date: Jan. 15, 2024

(87) PCT Pub. No.: WO2023/053386
PCT Pub. Date: Apr. 6, 2023

(65) Prior Publication Data
US 2024/0337288 A1     Oct. 10, 2024

(51) Int. Cl.
*F16C 19/54*        (2006.01)
*F16C 19/38*        (2006.01)

(52) U.S. Cl.
CPC .......... *F16C 19/548* (2013.01); *F16C 19/385* (2013.01)

(58) Field of Classification Search
CPC .... F16C 19/541; F16C 19/542; F16C 19/543; F16C 19/546; F16C 19/547; F16C 19/548
See application file for complete search history.

(56) References Cited

U.S. PATENT DOCUMENTS 1,999,891 A * 4/1935 Buckwalter ............. F16C 35/04
                                            384/459
2,875,004 A * 2/1959 Mcnicoll ................. B61F 15/12
                                            384/459

(Continued)

FOREIGN PATENT DOCUMENTS

CN        102207182 A      10/2011
CN        208519057 U       2/2019

(Continued)

OTHER PUBLICATIONS

International Search Report and Written Opinion of the International Searching Authority corresponding to counterpart International Patent Application PCT/JP2021/036244 mailed Dec. 14, 2021, English translation.

*Primary Examiner* — James Pilkington
(74) *Attorney, Agent, or Firm* — Renner, Otto, Boisselle & Sklar LLP

(57)                ABSTRACT

A roller bearing unit includes a shaft having a stepped part along a longitudinal axis; a first conical roller bearing which abuts the stepped part; a spacer that abuts, from a side opposite the stepped part, a first outer ring of the first conical roller bearing; a second conical roller bearing having a second outer ring that sandwiches the spacer between the first outer ring and the second outer ring, and a pressing member that is attached to the shaft and presses the first inner ring and the second inner ring in a direction to cause the first inner ring and the second inner ring to approach each other. A recess is recessed in a radial direction in an outer surface of the spacer to enable an external force along the longitudinal axis direction to be applied to the first outer ring from the spacer side.

7 Claims, 20 Drawing Sheets

(56)                    References Cited

U.S. PATENT DOCUMENTS 5,667,313 A  *   9/1997  Kapaan ................. B60B 35/121
                                                      384/504
2003/0086631 A1     5/2003  Faltus et al.

FOREIGN PATENT DOCUMENTS

| JP | S48-027843 B1 | 8/1973 |
| JP | H05-263824 A | 10/1993 |
| JP | H10-159860 A | 6/1998 |
| JP | 2006-258115 A | 9/2006 |
| JP | 2007-107576 A | 4/2007 |
| JP | 6640821 B | 2/2020 |
| JP | 2021-127783 A | 9/2021 |
| WO | 2006/092256 A1 | 9/2009 |

* cited by examiner

COMBINED CONICAL ROLLER BEARING UNIT AND METHOD FOR MANUFACTURING SAME

RELATED APPLICATION DATA

This application is a national phase of International Application No. PCT/JP2021/036244 filed Sep. 30, 2021, which is hereby incorporated herein by reference in its entirety.

TECHNICAL FIELD

The present disclosure relates to a combined conical roller bearing unit and a method for manufacturing the same.

BACKGROUND ART

In the related art, there is a known combined conical roller bearing in which two single-row conical roller bearings are combined (for example, see Patent Literature 1).

In the case in which such a combined conical roller bearing is assembled, first, an outer surface of a shaft is fitted to an inner ring of a first conical roller bearing, and an outer ring of the first conical roller bearing is fitted to an inner surface of a hole of a housing. Next, a spacer is fitted into the hole of the housing, a second conical roller bearing is subsequently inserted into a space between the outer surface of the shaft and the inner surface of the hole of the housing, and an inner ring of the second conical roller bearing is pressed, by means of a nut fastened to the shaft, in a direction toward the inner ring of the first conical roller bearing. By doing so, a combined conical roller bearing is assembled in a state in which a proper preload is applied to the two single-row conical roller bearings.

CITATION LIST

Patent Literature

{PTL 1} Japanese Unexamined Patent Application, Publication No. 2006-258115

SUMMARY OF INVENTION

An aspect of the present disclosure is a combined conical roller bearing unit including: a shaft having a stepped part at one portion in a longitudinal axis direction; a first conical roller bearing having a first inner ring to which the shaft is fitted and which abuts the stepped part in the longitudinal axis direction; a spacer having an abutting surface that abuts, from a side opposite the stepped part in the longitudinal axis direction, a first outer ring of the first conical roller bearing; a second conical roller bearing having a second outer ring that sandwiches the spacer between the first outer ring and the second outer ring, and a second inner ring to which an outer surface of the shaft is fitted; and a pressing member that is attached to the shaft and that presses the first inner ring and the second inner ring in a direction to cause the first inner ring and the second inner ring to approach each other, wherein a recess is provided, which is recessed in a radial direction in at least a portion of an outer surface of the spacer and which enables an external force along the longitudinal axis direction to be applied to the first outer ring from the spacer side.

DESCRIPTION OF EMBODIMENTS

A combined conical roller bearing unit 1 and a method for manufacturing the same according to a first embodiment of the present disclosure will be described below with reference to the drawings.

Figure 1:
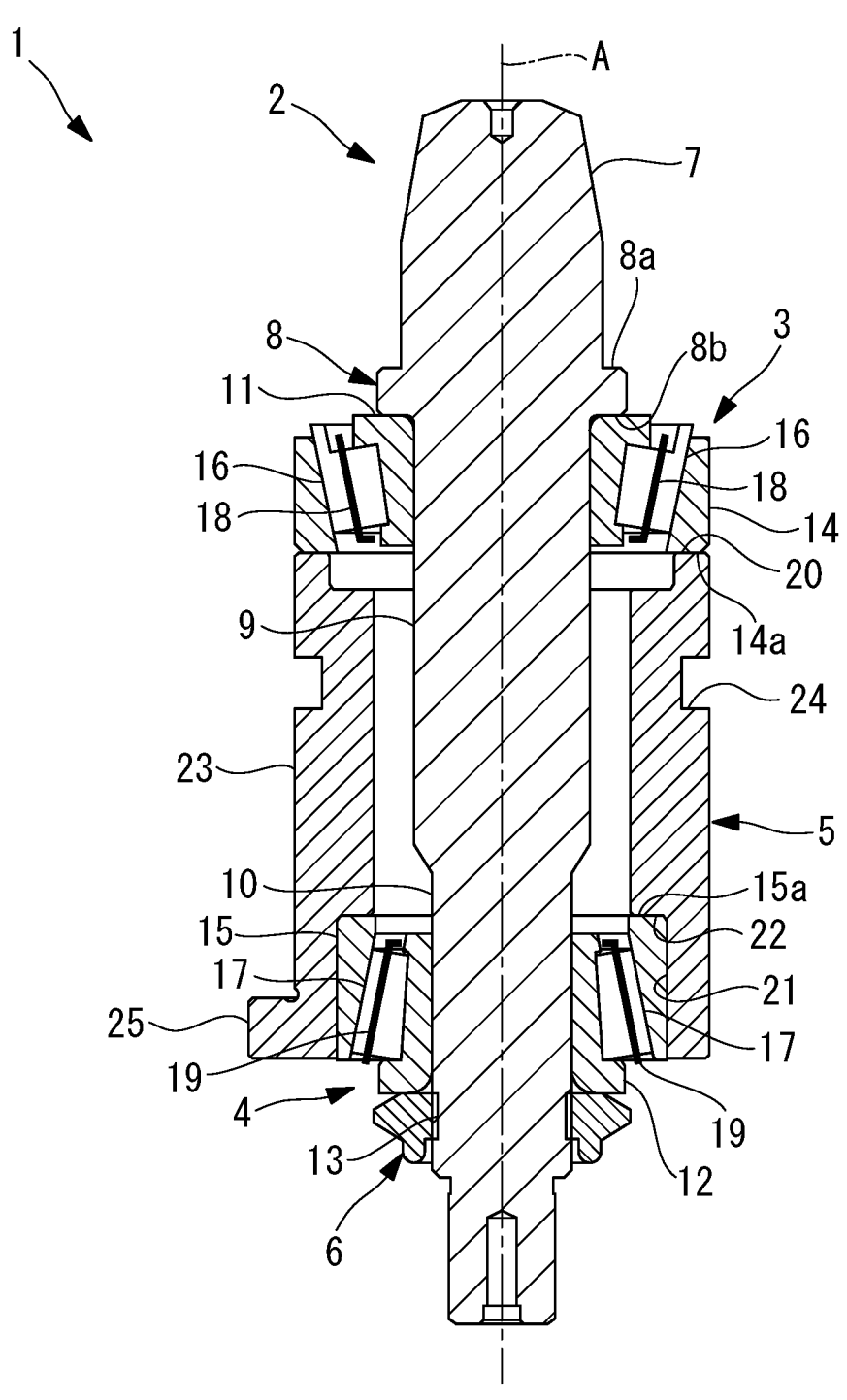
FIG. 1 is a longitudinal sectional view showing a combined conical roller bearing unit according to a first embodiment of the present disclosure.

As shown in FIG. 1, the combined conical roller bearing unit 1 according to this embodiment includes a shaft 2, two single-row conical roller bearings (first conical roller bearing and second conical roller bearing) 3, 4, a spacer 5, and a nut (pressing member) 6.

In an example shown in FIG. 1, the shaft 2 includes a gear 7 at one end thereof in a longitudinal axis A direction and also includes, at a position adjacent to the gear 7 in the longitudinal axis A direction, a flange part 8 extending radially outward over the entire circumference. The flange part 8 has two end faces 8a, 8b that extend in a direction orthogonal to the longitudinal axis A with a gap therebetween in the longitudinal axis A direction.

In addition, the shaft 2 includes, at a position adjacent to the flange part 8 in the longitudinal axis A direction, a first fitted outer surface 9 that is fitted to an inner ring (first inner ring) 11 of the first conical roller bearing 3. The end face 8b of the flange part 8 on the first fitted outer surface 9 side forms a stepped part against which the first inner ring 11 is abutted in the longitudinal axis A direction.

In addition, the shaft 2 includes, at a position adjacent to the first fitted outer surface 9 in the longitudinal axis A direction, a second fitted outer surface 10 that is fitted to an inner ring (second inner ring) 12 of the second conical roller bearing 4. In the example shown in FIG. 1, the first fitted outer surface 9 is formed so as to have a slightly larger diameter than the second fitted outer surface 10. In addition, a male thread 13 to which the nut 6 is fastened is formed on the shaft 2, at a position adjacent to the second fitted outer surface 10 in the longitudinal axis A direction.

The first conical roller bearing 3 and the second conical roller bearing 4 are each provided with: a plurality of rollers 16, 17 that are radially sandwiched between a conical outer surface of the inner ring 11, 12 and a conical inner surface of an outer ring 14, 15; and a retainer 18, 19 that maintains the circumferential positions of the rollers 16, 17.

The spacer 5 includes, at one end thereof, a first abutting surface (abutting surface) 20 that is abutted against an end face 14a of the outer ring (first outer ring) 14, on the second fitted outer surface 10 side in the longitudinal axis A direction, of the first conical roller bearing 3 in which the first fitted outer surface 9 is fitted to the inner ring 11. In addition, the spacer 5 includes a fitted inner surface (inner circumferential surface) 21 to which the outer ring (second outer ring) 15 of the second conical roller bearing 4, in which the second fitted outer surface 10 is fitted to the inner ring 12, is fitted, and a second abutting surface (stepped part) 22 against which an end face 15a of the outer ring 15, on the outer ring 14 side in the longitudinal axis A direction, fitted to the fitted inner surface 21 is abutted.

The first abutting surface 20 is abutted against the end face 14a of the outer ring 14 of the first conical roller bearing 3, on the second fitted outer surface 10 side, and the second abutting surface 22 is abutted against the end face 15a of the outer ring 15 of the second conical roller bearing 4, on the first fitted outer surface 9 side, whereby the spacer 5 is sandwiched between the outer rings 14, 15 of the two conical roller bearings 3, 4 in the longitudinal axis A direction.

In this embodiment, the spacer 5 includes an outer circumferential surface 23 having the same outer diameter dimension as the outer diameter of the outer ring 14 of the first conical roller bearing 3. With this configuration, an outer surface of the outer ring 14 of the first conical roller bearing 3, in a state in which the first abutting surface 20 is abutted against the end face 14a, and the outer circumferential surface 23 of the spacer 5 form a cylindrical surface continuous in the longitudinal axis A direction.

In addition, in this embodiment, the spacer 5 is provided with a circumferential groove (recess) 24 that is recessed radially inward at an intermediate position of the outer circumferential surface 23 in the longitudinal axis A direction. The circumferential groove 24 has, for example, a rectangular cross-sectional shape, and at least an inner wall surface on the first abutting surface 20 side extends in a direction orthogonal to the longitudinal axis A. In addition, the circumferential groove 24 has a groove width larger than the width dimension of a claw part 120 of a hand 100 of a robot, which will be described later, so that the claw part 120 can be inserted thereinto.

In addition, a flange part 25 extending radially outward from the outer circumferential surface 23 is provided in an end portion of the spacer 5 on the side opposite the first abutting surface 20. The flange part 25 is provided with one or more through-holes parallel to the longitudinal axis A direction, and thus, it is possible to fix the combined conical roller bearing unit 1 to another member by means of bolts.

A method for manufacturing the thus-configured combined conical roller bearing unit 1 according to this embodiment will be described below.

Figure 2:
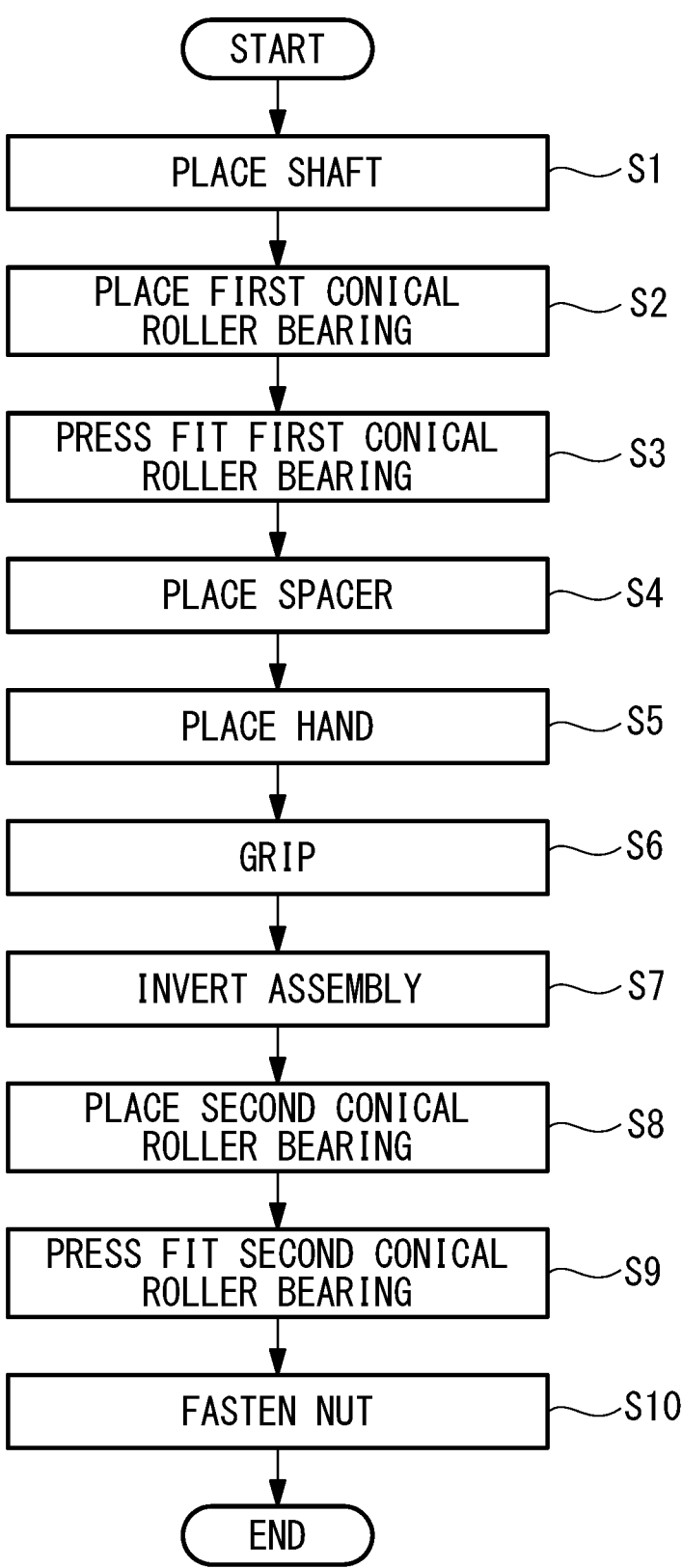
FIG. 2 is a flowchart showing a method for manufacturing the combined conical roller bearing unit in FIG. 1.
Figure 3:
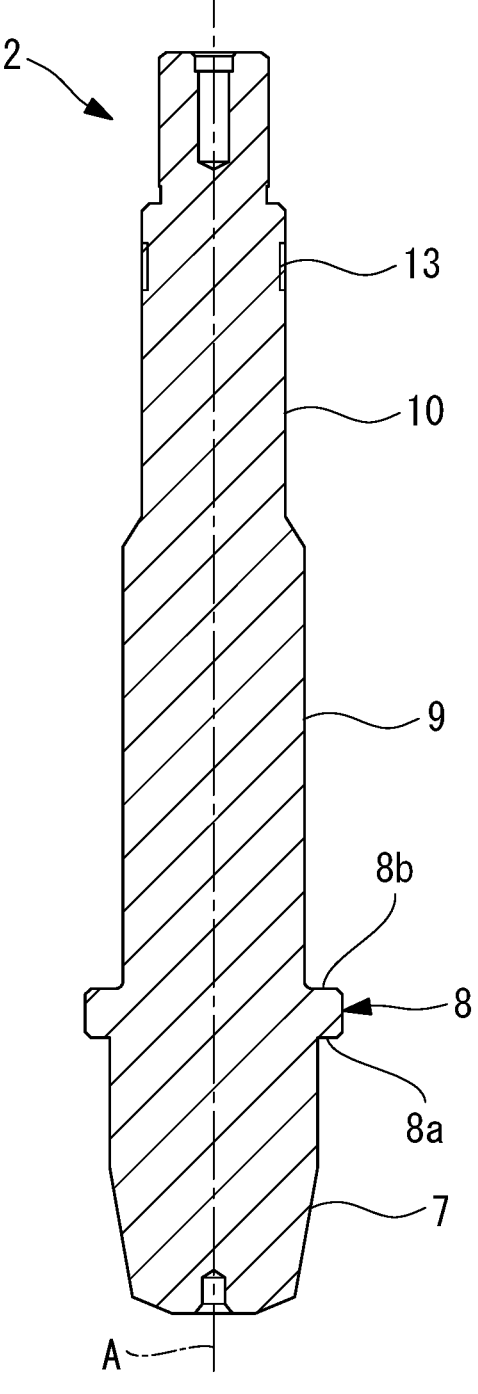
FIG. 3 is a diagram showing a state in which a shaft is placed in the manufacturing method in FIG. 2.
Figure 4:
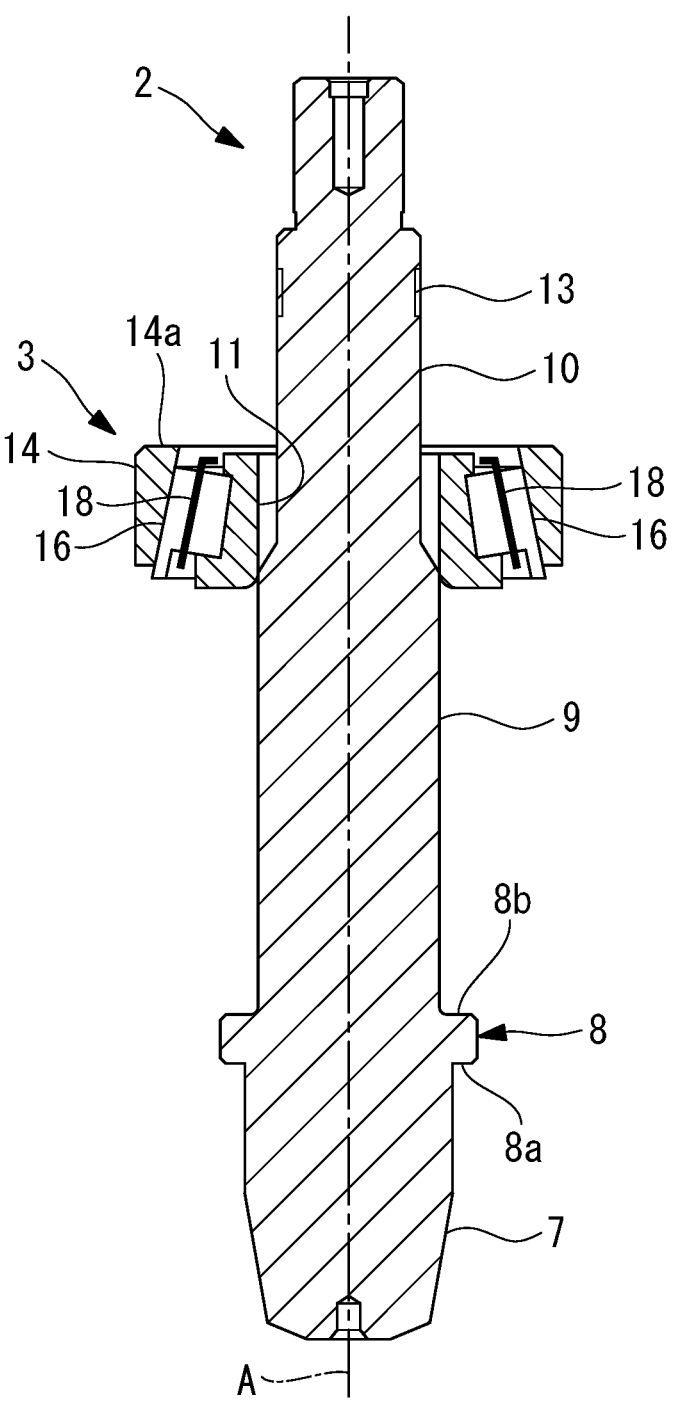
FIG. 4 is a longitudinal sectional view showing a state in which a first conical roller bearing is inserted from above the shaft in FIG. 3.

In order to manufacture the combined conical roller bearing unit 1 according to this embodiment, first, as shown in FIGS. 2 and 3, the shaft 2 is placed vertically in the longitudinal axis A direction, and an end portion provided with the gear 7 is placed on the lower side (step S1). Then, as shown in FIG. 4, the first conical roller bearing 3 is attached from above the shaft 2 (step S2).

Figure 5:
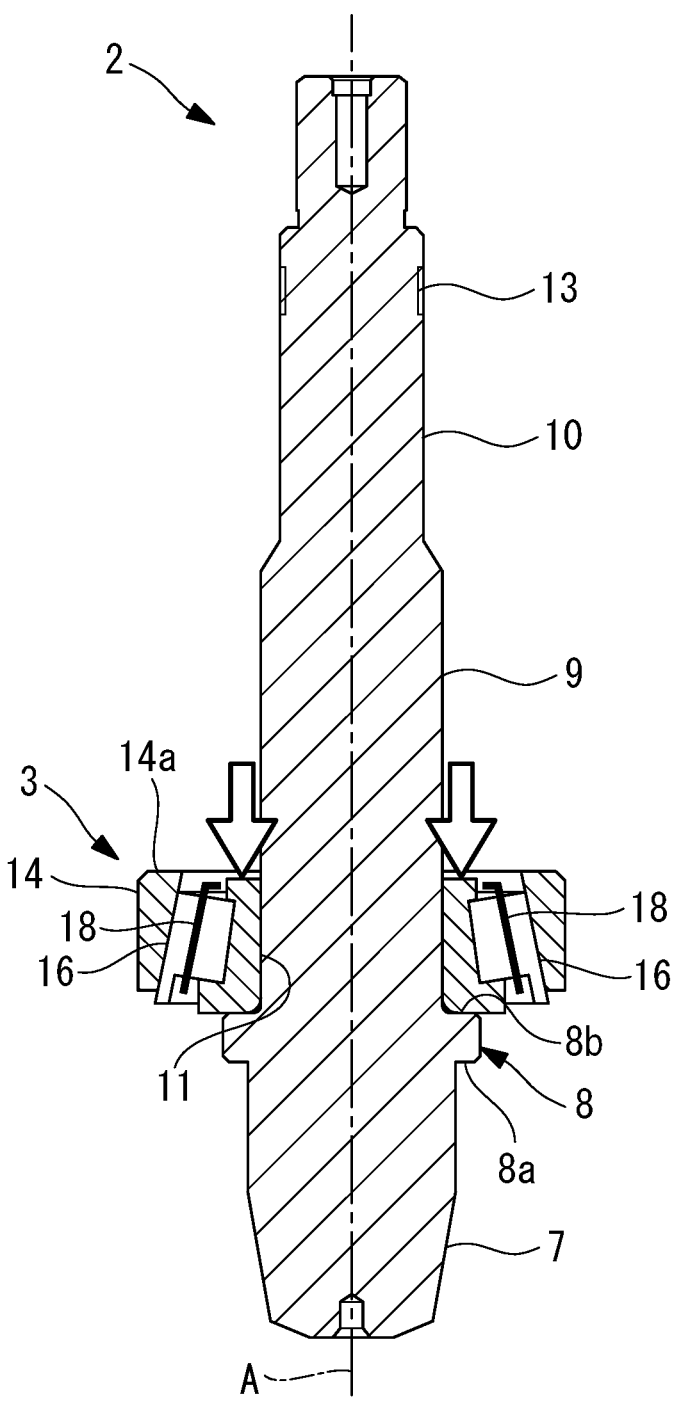
FIG. 5 is a longitudinal sectional view showing a state in which the shaft is press fitted into an inner ring of the first conical roller bearing in FIG. 4.

In other words, the first conical roller bearing 3 is brought close to the shaft 2 from above to insert the shaft 2 into the inner ring 11, and an inner surface of the inner ring 11 of the first conical roller bearing 3 is aligned with the first fitted outer surface 9. Then, as shown in FIG. 5, the inner ring 11 is pressurized from above by a press device or the like while the shaft 2 is supported from below, whereby the inner ring 11 is press fitted to the shaft 2 until the inner ring 11 abuts the end face 8b of the flange part 8 (step S3).

Figure 6:
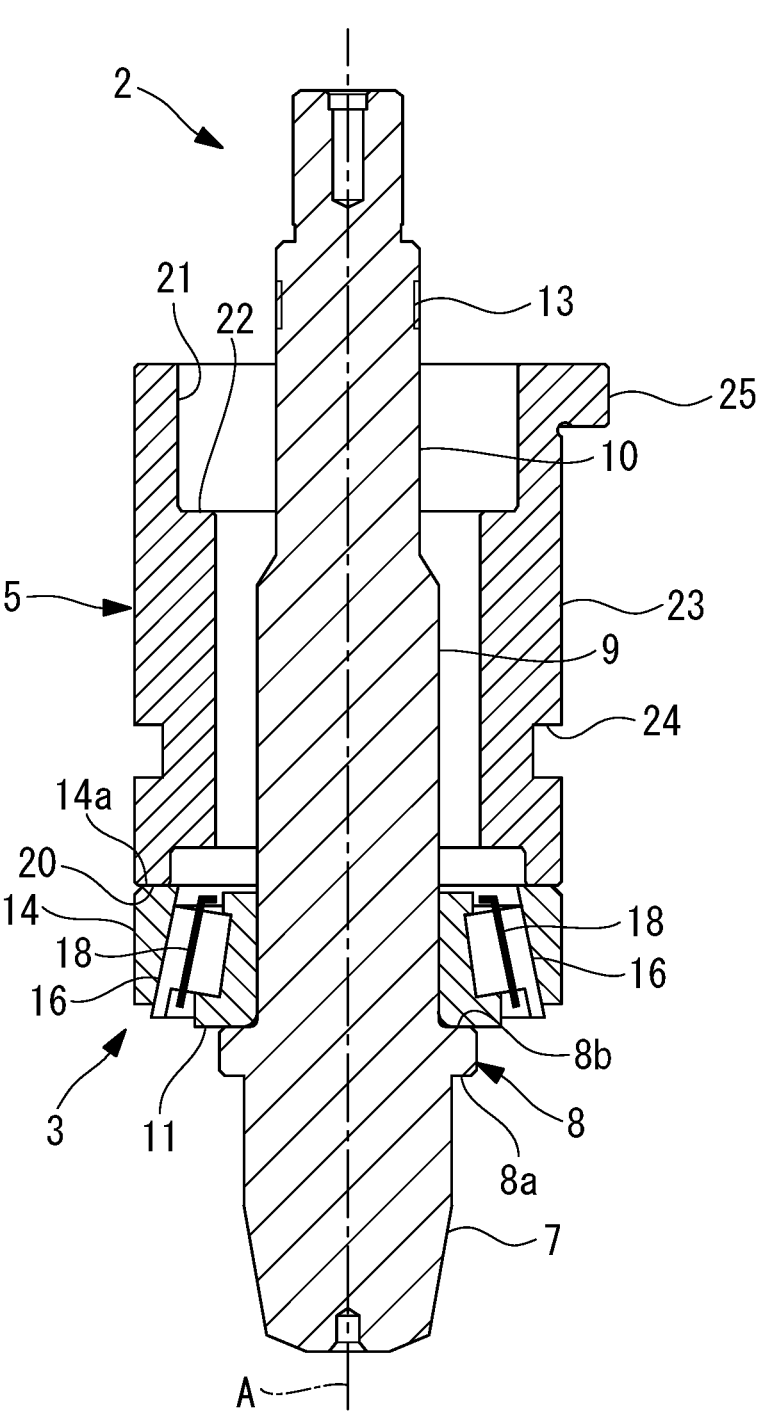
FIG. 6 is a longitudinal sectional view showing a state in which a spacer is placed from above the first conical roller bearing in FIG. 5.

Next, as shown in FIG. 6, the spacer 5 is brought close to the shaft 2 from above to make the shaft 2 pass through the spacer 5, and the first abutting surface 20 of the spacer 5 is abutted against the end face 14a of the outer ring 14 of the first conical roller bearing 3 (step S4).

Figure 7:
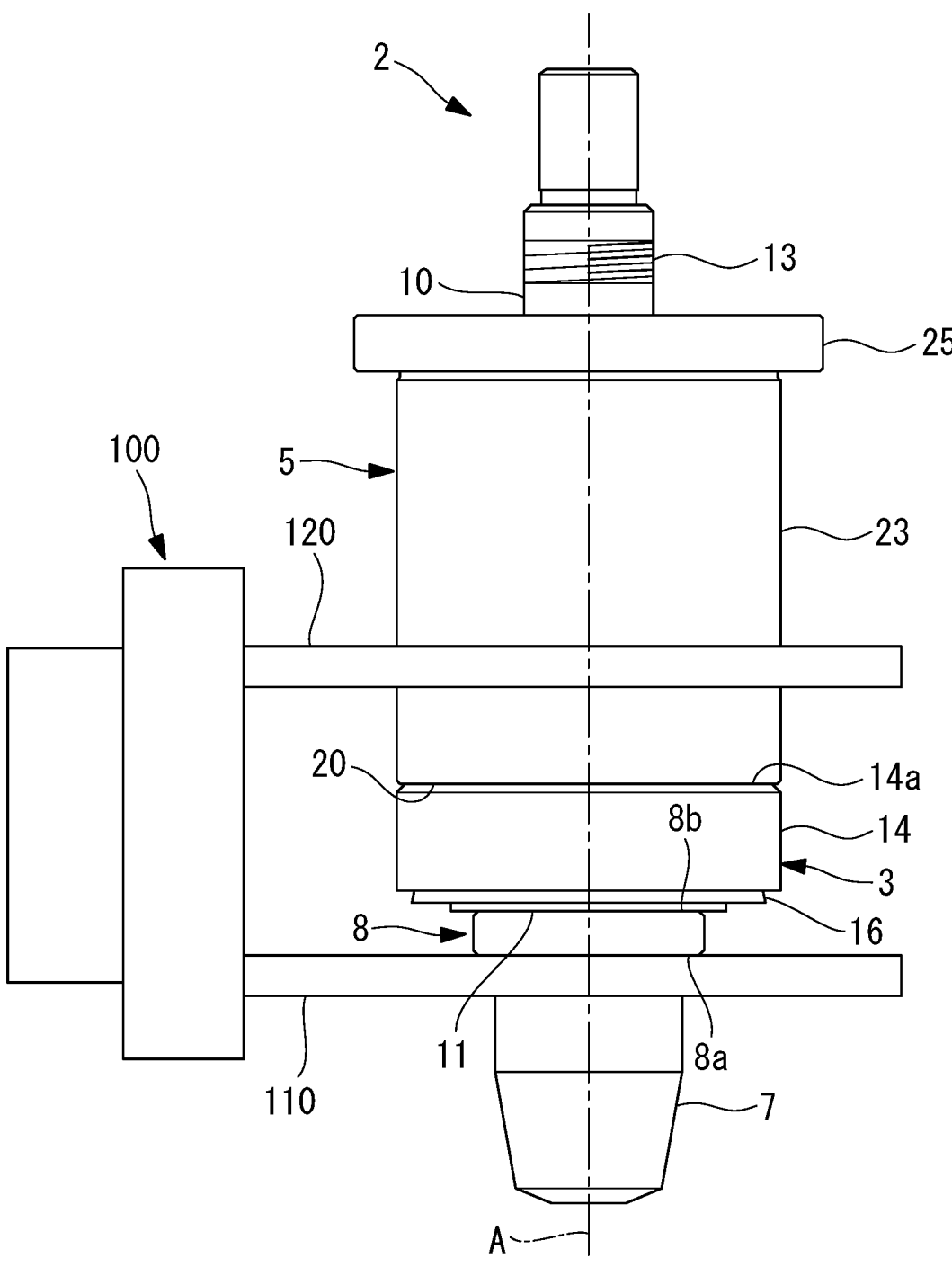
FIG. 7 is a side view showing a state in which the assembly in FIG. 6 is gripped by a hand.
Figure 8:
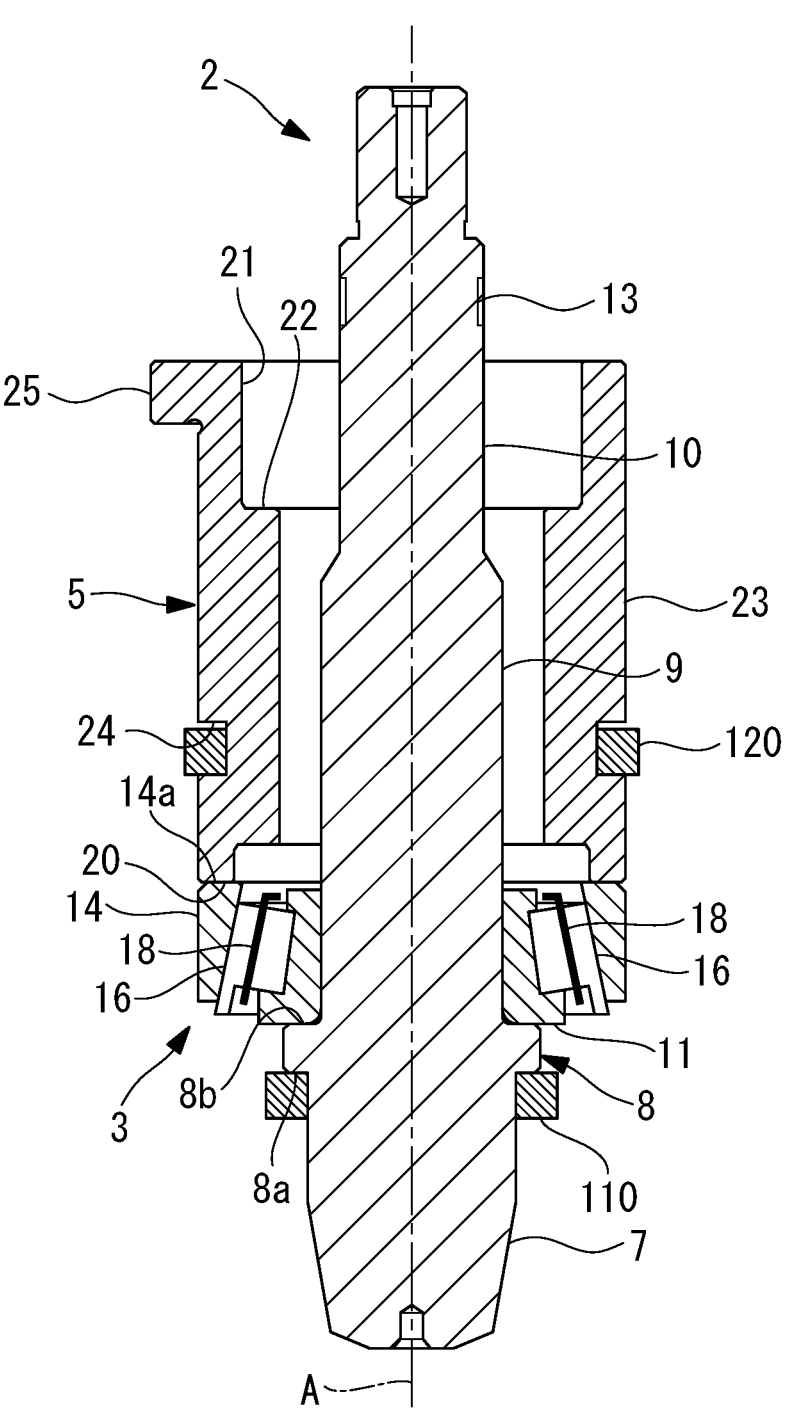
FIG. 8 is a longitudinal sectional view of FIG. 7.
Figure 9:
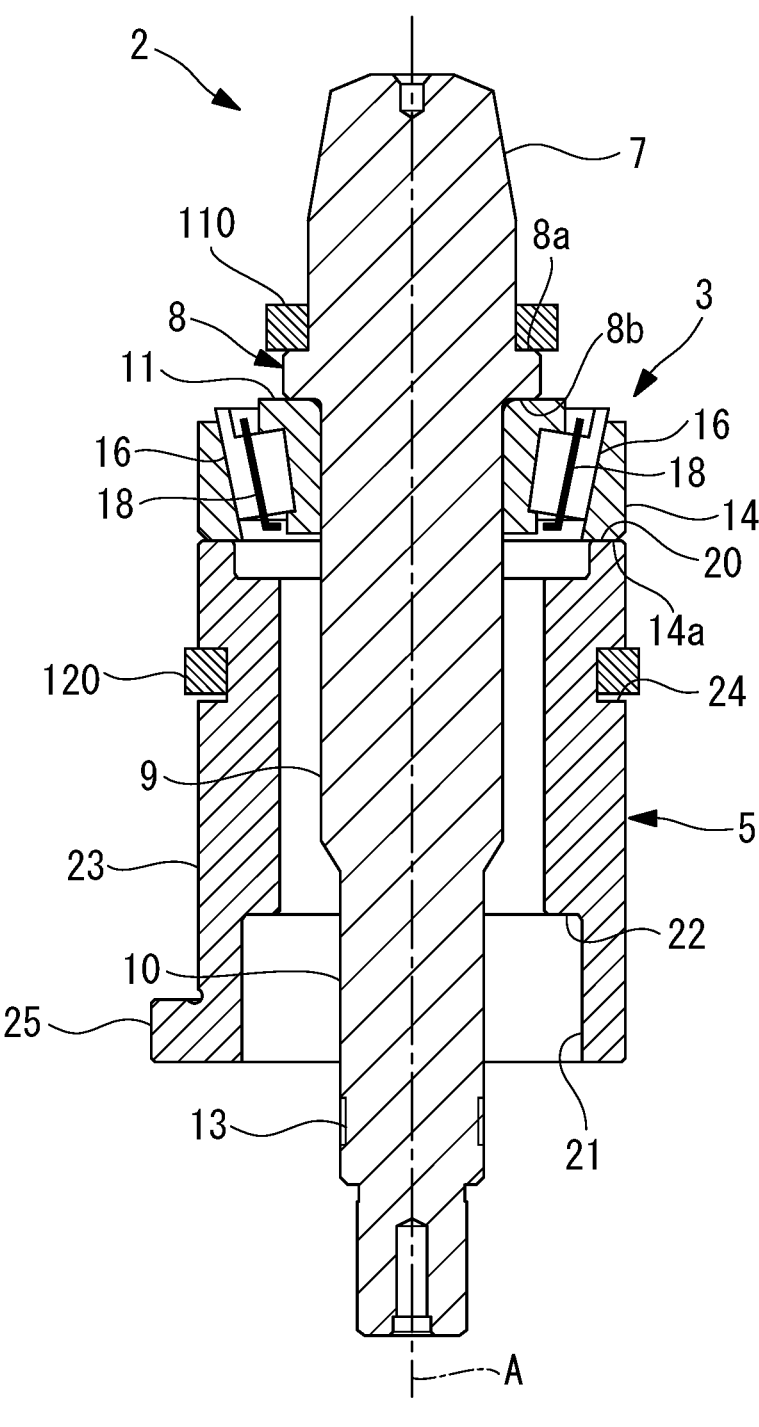
FIG. 9 is a longitudinal sectional view showing a state in which the assembly in FIG. 8 is inverted by the hand.

In this state, as shown in FIGS. 7 and 8, one claw part 110 of the hand 100 mounted on the robot is brought into close contact with the end face 8a of the flange part 8 of the shaft 2, on the gear 7 side, and the other claw part 120 is brought into close contact with the inner wall surface of the circumferential groove 24 provided in the spacer 5, on the first abutting surface 20 side (step S5). Then, a prescribed force is applied in a direction in which the pair of claw parts 110, 120 are brought close to each other to perform gripping (step S6), and as shown in FIG. 9, an assembly of the shaft 2, the first conical roller bearing 3, and the spacer 5 is inverted (step S7).

Figure 10:
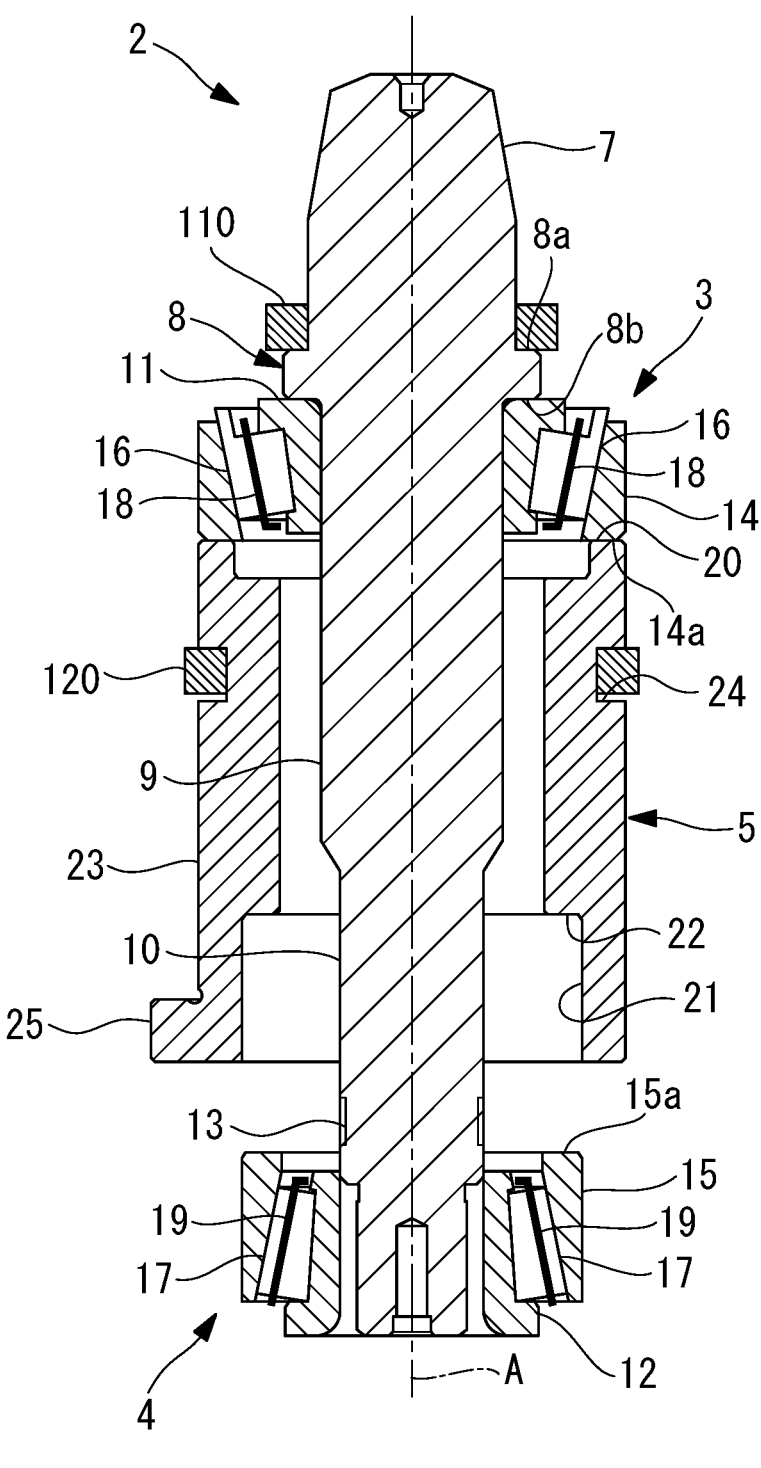
FIG. 10 is a longitudinal sectional view showing a state in which a second conical roller bearing is inserted from below the assembly in FIG. 9.
Figure 11:
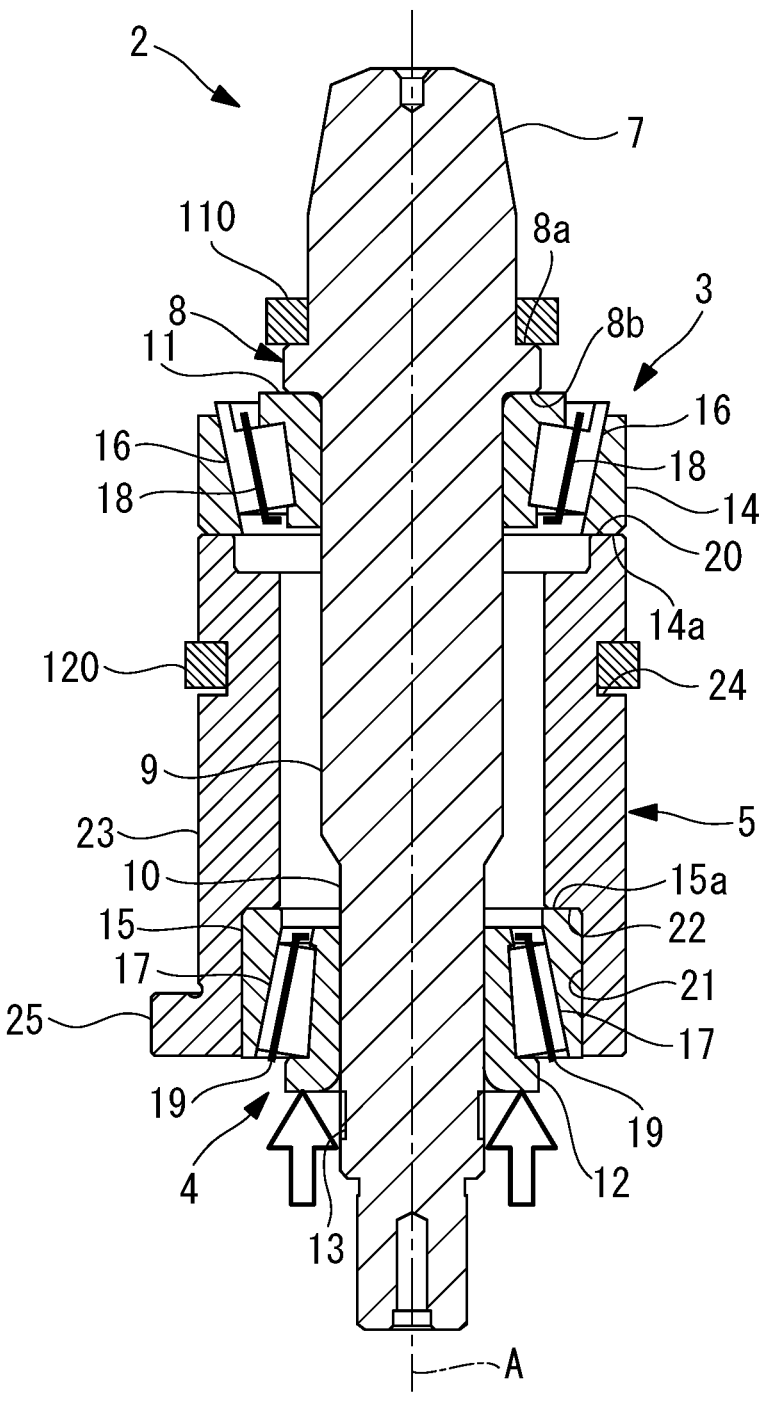
FIG. 11 is a longitudinal sectional view showing a state in which the second conical roller bearing is press fitted into a space between the shaft and the spacer from the state in FIG. 10.

Next, as shown in FIG. 10, the second conical roller bearing 4 placed below the shaft 2 is brought close to the shaft 2 from below to insert the shaft 2 into the inner ring 12, and the inner ring 12 is aligned with the second fitted outer surface 10 and the outer ring 15 is aligned with the fitted inner surface 21 of the spacer 5 (step S8). Then, the inner ring 12 of the second conical roller bearing 4 is pressurized from below by a press device or the like while the shaft 2 is supported in an upper portion thereof, whereby the inner ring 12 is press fitted to the second fitted outer surface 10 of the shaft 2 (step S9). By doing so, as shown in FIG. 11, the outer ring 15 of the second conical roller bearing 4 is fitted to the fitted inner surface 21 of the spacer 5 until the end face 15a of the outer ring 15 abuts the second abutting surface 22 of the spacer 5.

Figure 12:
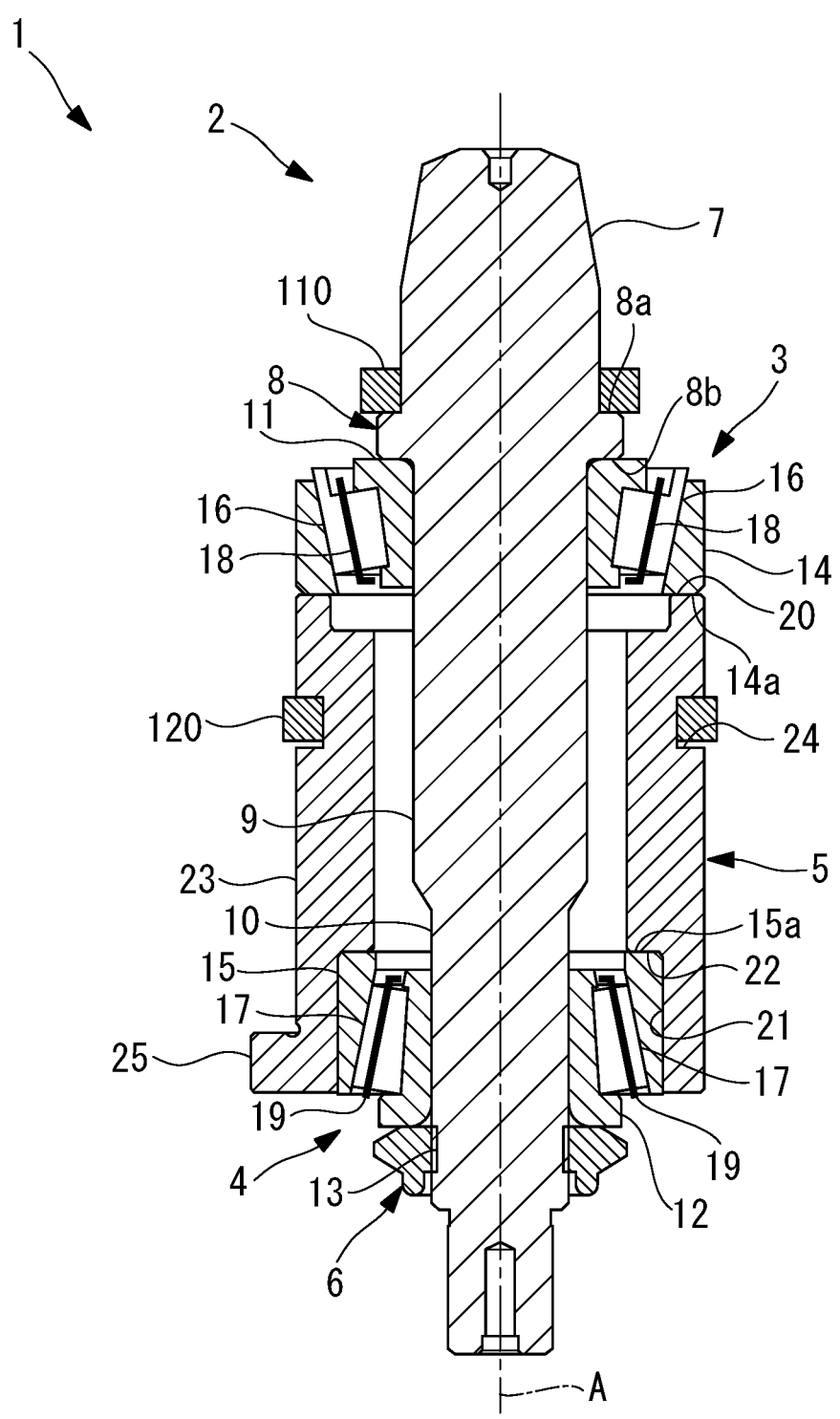
FIG. 12 is a longitudinal sectional view showing a state in which a nut inserted from below the assembly in FIG. 11 is fastened to the shaft.

In this state, the robot is actuated to move an assembly of the shaft 2, the two conical roller bearings 3, 4, and the spacer 5 to a position above a nut runner (not shown), and the shaft 2 is inserted, from above, into the nut 6 supported by the nut runner. Then, as shown in FIG. 12, the nut runner is actuated to fasten the nut 6 to the male thread 13 of the shaft 2 while measuring the tightening torque (step S10).

By doing so, the inner rings 11, 12 of the two conical roller bearings 3, 4 are pressed in a direction in which the inner rings 11, 12 approach each other in the longitudinal axis A direction, and when the nut 6 is fastened to a prescribed tightening torque, the two conical roller bearings 3, 4 are put in a state in which a prescribed preload is applied thereto. Then, by releasing the gripping by the hand 100 in the state in which the preload is applied to the two conical roller bearings 3, 4, the combined conical roller bearing unit 1 is completed.

As described above, with the combined conical roller bearing unit 1 and the method for manufacturing the same according to this embodiment, it is possible to grip the assembly, by means of the hand 100, in a direction in which the flange part 8 of the shaft 2 and the recess 24 of the spacer 5 are brought close to each other. By doing so, it is possible to maintain a close contact state between the rollers 16 and the outer ring 14 of the first conical roller bearing 3 in a state in which the inner ring 11 is press fitted to the shaft 2, until a preload is applied by fastening the nut 6.

As a result, even in a state in which the first conical roller bearing 3 is inverted and the gravity is applied in a direction in which the outer ring 14 is separated from the rollers 16, it is possible to maintain the close contact state between the rollers 16 and the outer ring 14.

In other words, with this embodiment, the spacer 5 is provided with the circumferential groove 24 in the outer circumferential surface 23 thereof, and thus, it is possible to insert the claw part 120 of the hand 100 into the circumferential groove 24 and maintain, by means of the hand 100, a state in which a force is applied in a direction in which the outer ring 14 of the first conical roller bearing 3 is brought into close contact with the rollers 16.

In addition, it is possible to apply a preload by fastening the nut 6 while the close contact state is maintained between the rollers 16 and the outer ring 14 of the first conical roller bearing 3. By doing so, it is possible to prevent an unstable state in which the outer ring 14 is separated from the rollers 16 during the assembly work, and thus, when a preload is applied, it is possible to prevent in advance the occurrence of a problem in which the rollers 16 become caught in the retainer 18 and skewed.

In addition, by preventing the rollers 16 from becoming caught in the retainer 18, it is not necessary for a worker to tighten the nut 6 until a required dynamic torque is measured while rotating the shaft 2 to confirm that the skew does not occur; thus, it is possible to eliminate the complicated work. In addition, as described above, the work can be automated by means of a robot or the like without relying on the senses of a worker; therefore, there is an advantage in that it is possible to manufacture the combined conical roller bearing unit 1 of stable quality.

In addition, with the combined conical roller bearing unit 1 according to this embodiment, the first conical roller bearing 3 is made larger than the second conical roller bearing 4, and thus, it is possible to effectively support the force applied to the gear 7. Furthermore, as a result of the outer ring 15 of the second conical roller bearing 4 being fitted to the fitted inner surface 21 of the spacer 5, the spacer 5 can be provided with the flange part 25, and this configuration makes it possible to fix the combined conical roller bearing unit 1 to another member with a small number of components.

Figure 13:
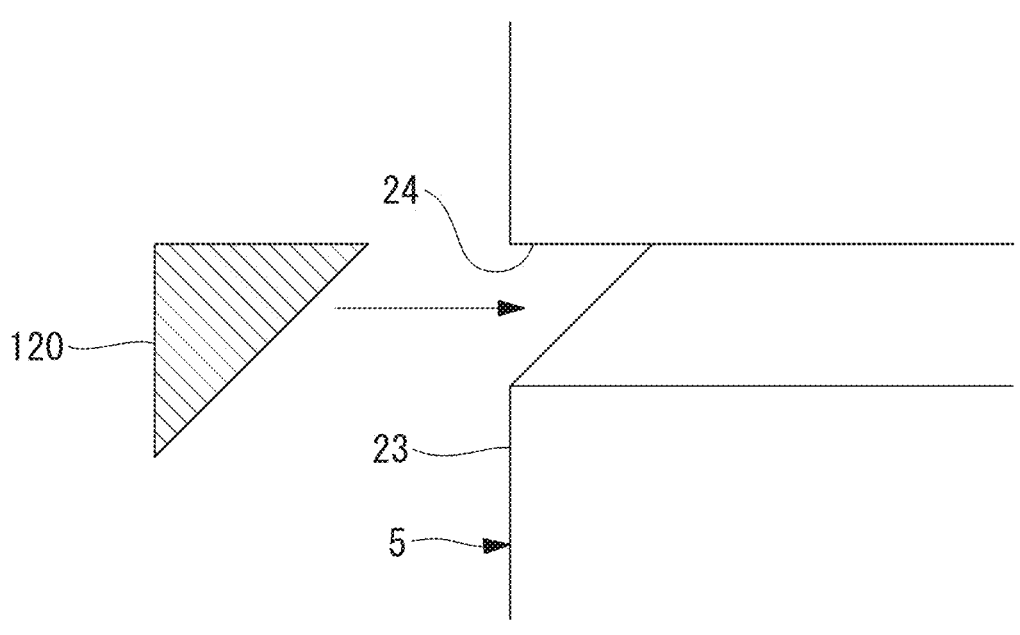
FIG. 13 is a partial sectional view showing another example of a claw of the hand.

Note that, with the combined conical roller bearing unit 1 according to this embodiment, the circumferential groove 24 provided in the outer circumferential surface 23 of the spacer 5 has a rectangular cross-sectional shape. Alternatively, an arbitrary cross-sectional shape may be adopted so long as the shape allows an external force along the longitudinal axis A direction to be applied to the outer ring 14 of the first conical roller bearing 3 from the spacer 5 side. For example, as shown in FIG. 13, a circumferential groove 24 having a triangular cross-sectional shape may be provided.

Figure 14:
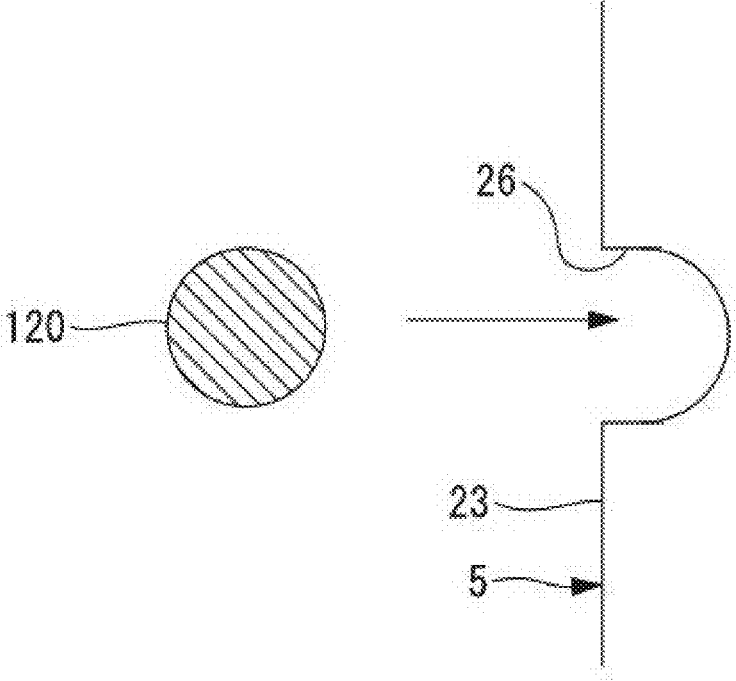
FIG. 14 is a partial sectional view showing another example of the claw of the hand.

In addition, adopting the circumferential groove 24 as the recess enables gripping by the hand 100 regardless of the angular position of the spacer 5 about the longitudinal axis A. Alternatively, if it is possible to set the angular position of the spacer 5 about the longitudinal axis A, grooves may be provided at a plurality of locations spaced apart in the circumferential direction, for example, at two locations separated by 180° in the circumferential direction. In addition, as shown in FIG. 14, a hole 26 may be provided as the recess, instead of a groove, so long as the shape allows the claw part 120 of the hand 100 to be hooked.

In addition, although the position of the recess 24 may be an arbitrary position on the spacer 5 in the longitudinal axis A direction, it is preferable to set the position as close as possible to the first abutting surface 20 pressing the outer ring 14 of the first conical roller bearing 3, since the position makes it possible to reliably transmit an external force applied from the claw part 120 of the hand 100 to the outer ring 14 of the first conical roller bearing 3.

Figure 15:
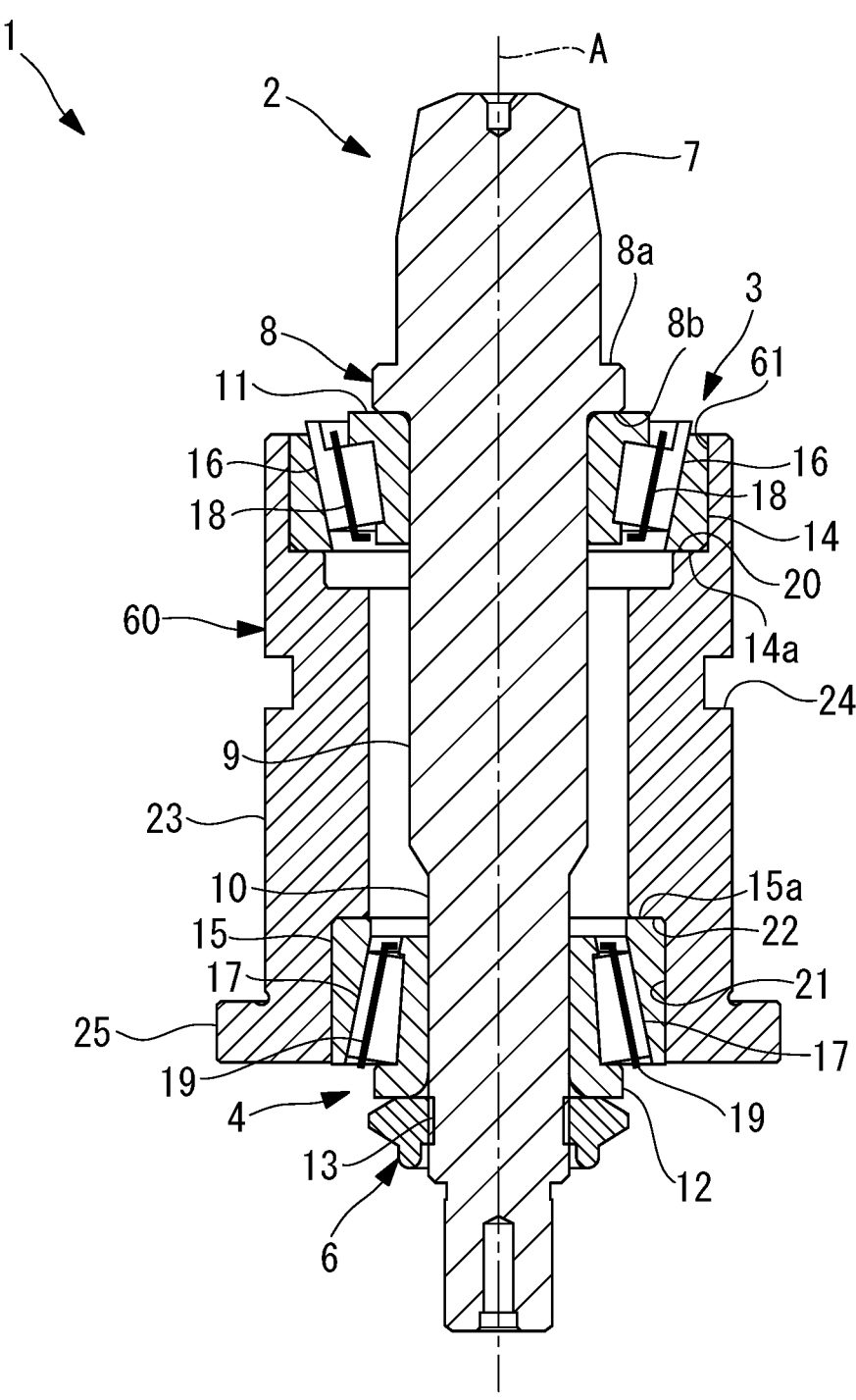
FIG. 15 is a longitudinal sectional view showing a modification of the combined conical roller bearing unit according to the first embodiment of the present disclosure.

In addition, although the spacer 5 having a structure in which only the second conical roller bearing 4 is accommodated is adopted in this embodiment, alternatively, as shown in FIG. 15, it is permissible to adopt a spacer 60 having a structure in which both of the two conical roller bearings 3, 4 are accommodated. In this case, the spacer 60 includes a fitted inner surface 61 to which the outer ring 14 of the first conical roller bearing 3 is fitted, in a state in which the first fitted outer surface 9 is fitted to the inner ring 11.

Next, a combined conical roller bearing unit 50 and a method for manufacturing the same according to a second embodiment of the present disclosure will be described below with reference to the drawings.

In the description of this embodiment, parts having the same configuration as those in the combined conical roller bearing unit 1 according to the abovementioned first embodiment will be assigned the same reference signs, and descriptions thereof will be omitted.

Figure 16:
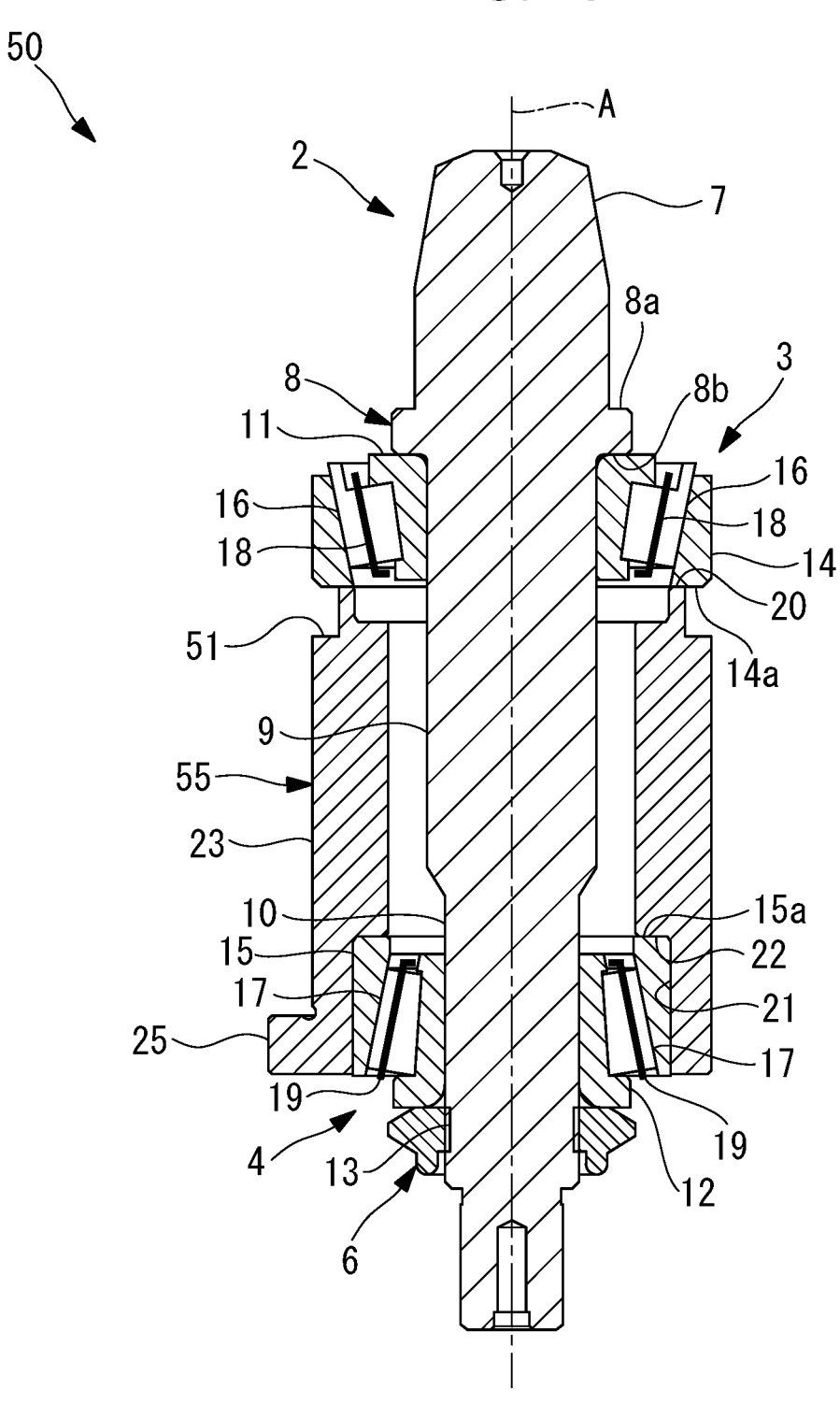
FIG. 16 is a longitudinal sectional view showing a combined conical roller bearing unit according to a second embodiment of the present disclosure.

As shown in FIG. 16, the combined conical roller bearing unit 50 according to this embodiment is provided with a notch (recess) 51 in an end portion including the first abutting surface 20, instead of the circumferential groove 24 that is provided at an intermediate position of the spacer 5 in the longitudinal axis A direction in the first embodiment.

The notch 51 is formed by making the outer diameter of the end portion of a spacer 55 on the first abutting surface 20 side smaller, by one step, than the outer diameter of the outer circumferential surface 23 of the spacer 55. The notch 51 may have an arbitrary width so long as the width is equal to or larger than the width of the claw part 120 of the hand 100 of the robot used in the first embodiment.

A method for manufacturing the thus-configured combined conical roller bearing unit 50 according to this embodiment will be described below.

Figure 17:
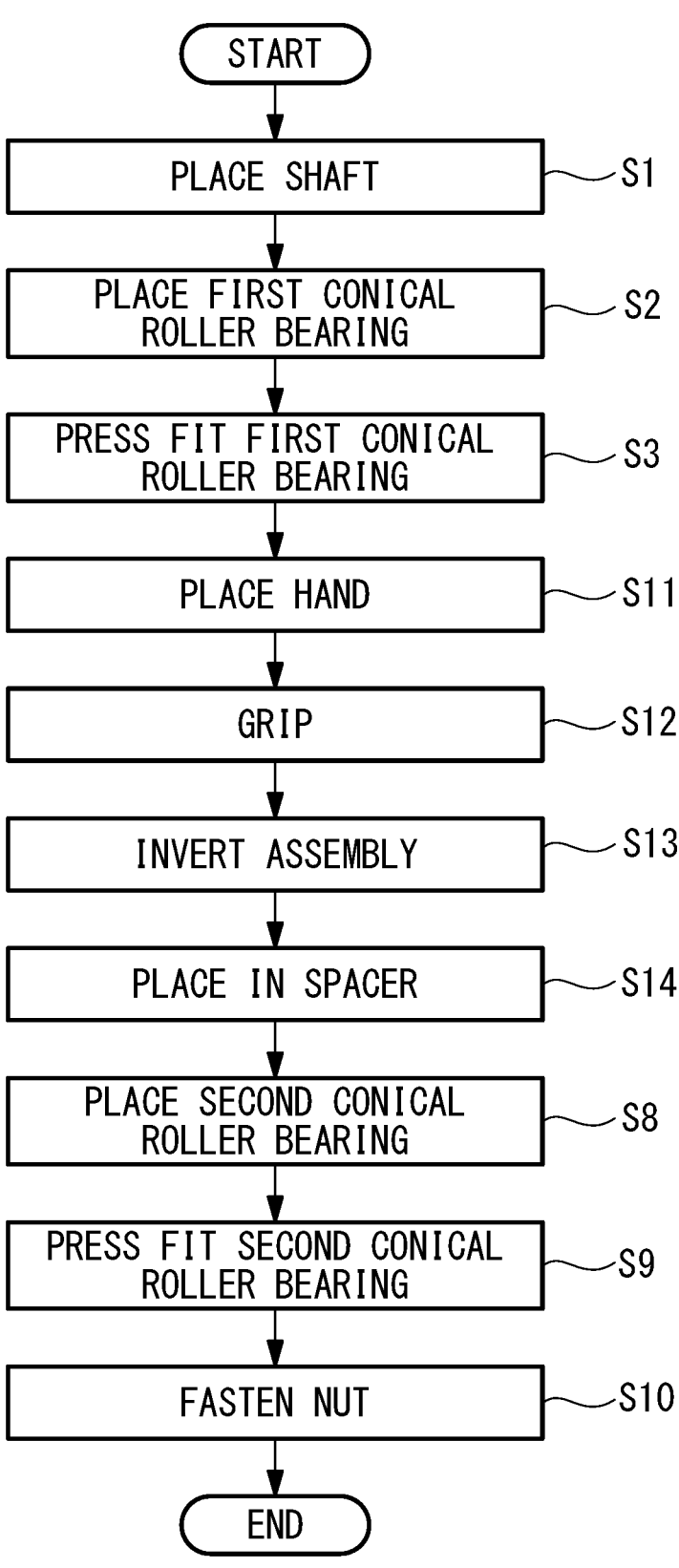
FIG. 17 is a flowchart showing a method for manufacturing the combined conical roller bearing unit in FIG. 16.
Figure 18:
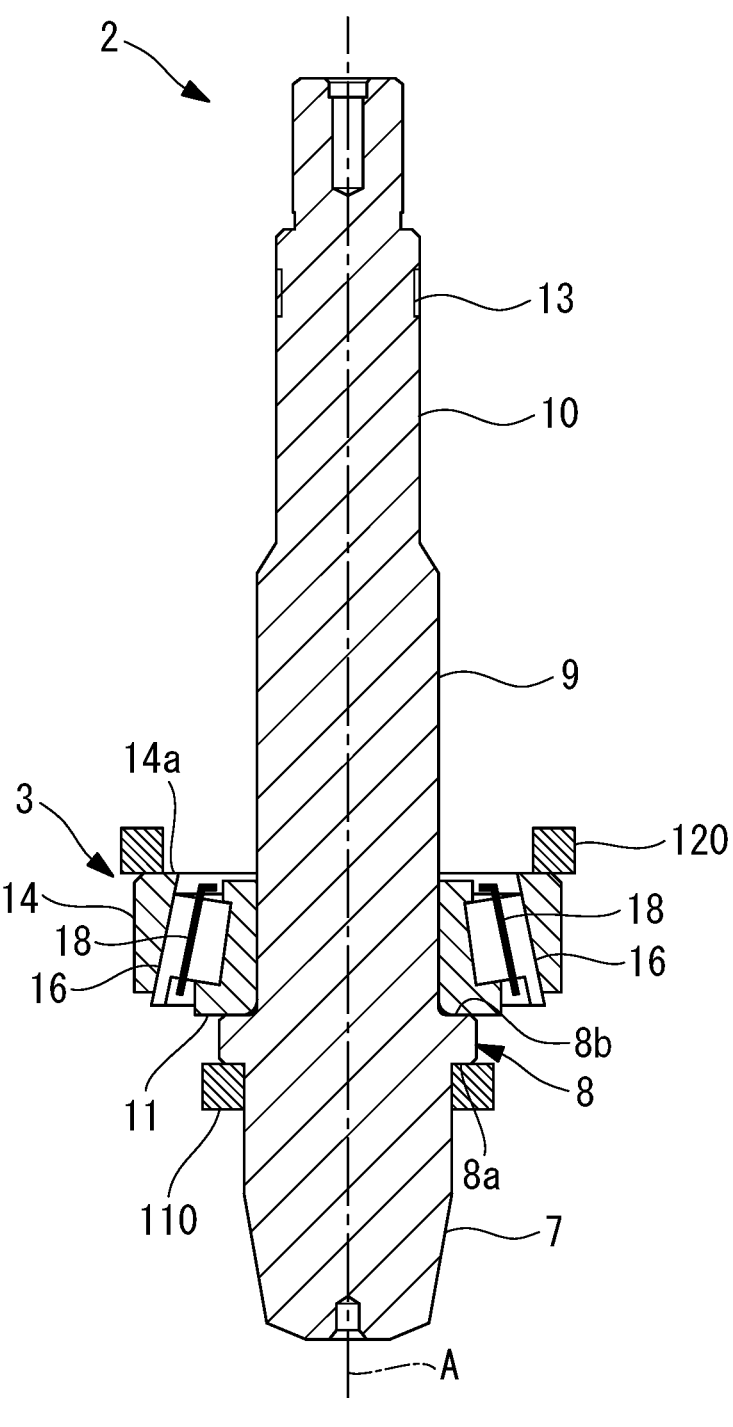
FIG. 18 is a longitudinal sectional view for explaining the method for manufacturing the combined conical roller bearing unit in FIG. 16.

In this embodiment, first, as shown in FIG. 17, the same processes as steps S1 to S3 in the first embodiment are performed. Subsequently, as shown in FIG. 18, one claw part 110 of the hand 100 mounted on the robot is brought into close contact with the end face 8a of the flange part 8 of the shaft 2, on the gear 7 side, and the other claw part 120 is brought into close contact with the end face 14a of the outer ring 14 of the first conical roller bearing 3 (step S11).

Figure 19:
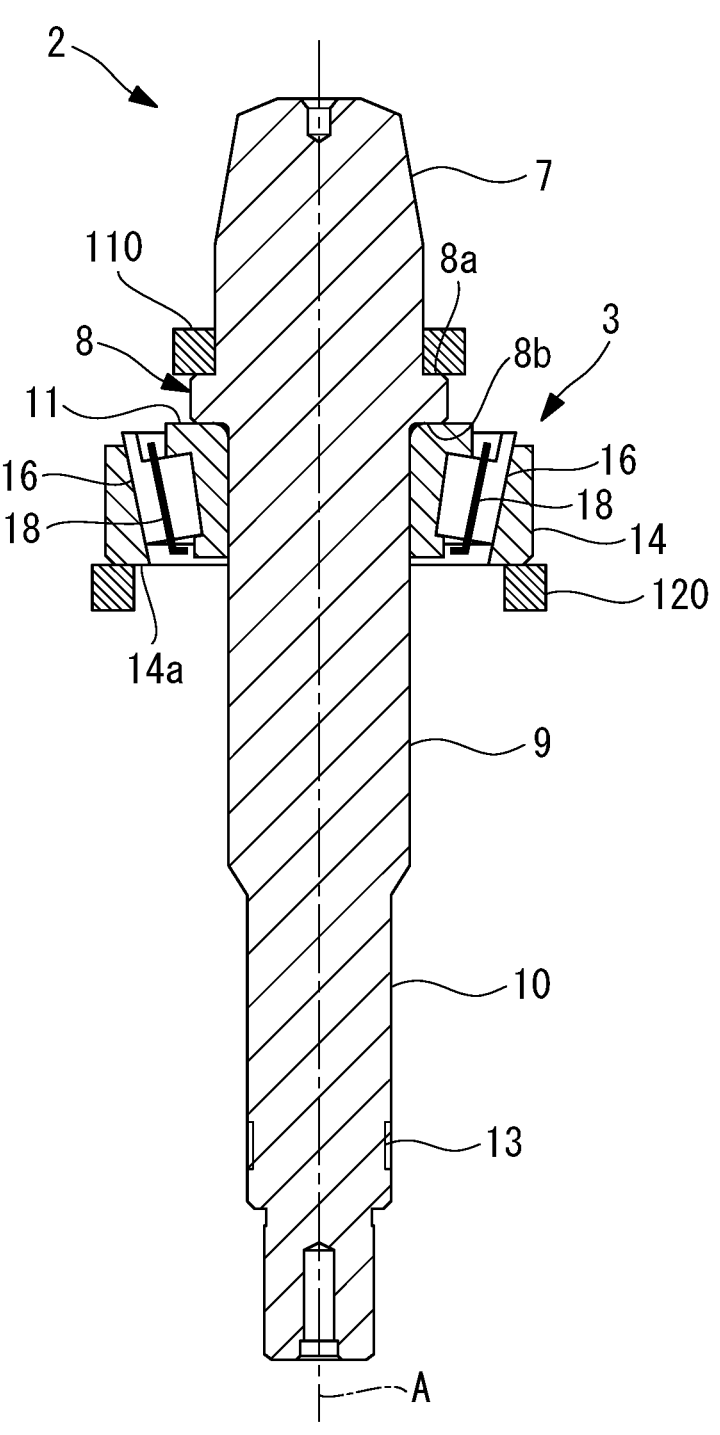
FIG. 19 is a longitudinal sectional view showing a state in which the assembly in FIG. 18 is inverted by the hand.
Figure 20:
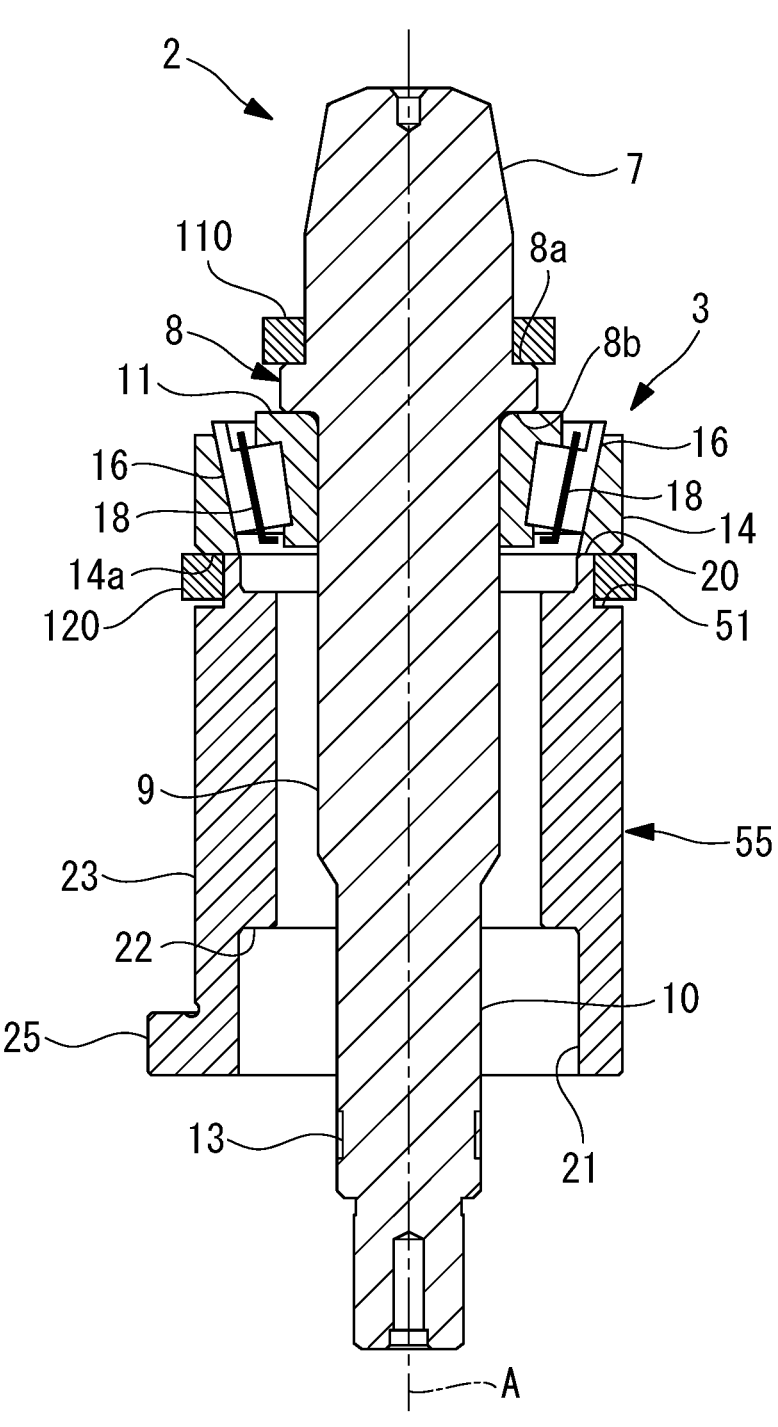
FIG. 20 is a longitudinal sectional view showing a state in which a spacer is placed in a lower portion of the assembly in FIG. 19.

Then, a prescribed force is applied in a direction in which the pair of claw parts 110, 120 are brought close to each other to perform gripping (step S12), and as shown in FIG. 19, an assembly of the shaft 2 and the first conical roller bearing 3 is inverted (step S13). In this state, for example, the assembly is brought close, from above, to the spacer 55 placed in a press device to insert the shaft 2 into the spacer 55, as shown in FIG. 20. By doing so, the end face 14a of the outer ring 14 of the first conical roller bearing 3 is abutted against the first abutting surface 20 of the spacer 55 (step S14).

Then, by sequentially performing the processes from step S8 to step S10, the combined conical roller bearing unit 50 can be manufactured.

With the combined conical roller bearing unit 50 and the method for manufacturing the same according to this embodiment also, it is possible to maintain a close contact state between the rollers 16 and the outer ring 14 of the first conical roller bearing 3 in a state in which the inner ring 11 is press fitted to the shaft 2, until a preload is applied by fastening the nut 6.

By doing so, it is possible to prevent an unstable state in which the outer ring 14 is separated from the rollers 16 during the assembly work, and thus, when a preload is applied, it is possible to prevent in advance the occurrence of a problem in which the rollers 16 become caught in the retainer 18 and skewed. In addition, by preventing the rollers 16 from becoming caught in the retainer 18, it is not necessary for a worker to tighten the nut 6 until a required dynamic torque is measured while rotating the shaft 2 to confirm that the skew does not occur; thus, it is possible to eliminate the complicated work. Furthermore, as described above, the work can be automated by means of a robot or the like without relying on the senses of a worker; therefore, there is an advantage in that it is possible to manufacture the combined conical roller bearing unit 50 of stable quality.

In particular, with the combined conical roller bearing unit 50 and the method for manufacturing the same according to this embodiment, the claw part 120 of the hand 100 is brought into direct contact with the end face 14a of the outer ring 14 of the first conical roller bearing 3; therefore, there is an advantage in that the external force from the hand 100 is more easily transmitted to the first conical roller bearing 3 as compared with the first embodiment. As a result, it is possible to maintain the contact state between the rollers 16 and the outer ring 14 of the first conical roller bearing 3 in a more reliable manner, thereby stabilizing the rollers 16.

Figure 21:
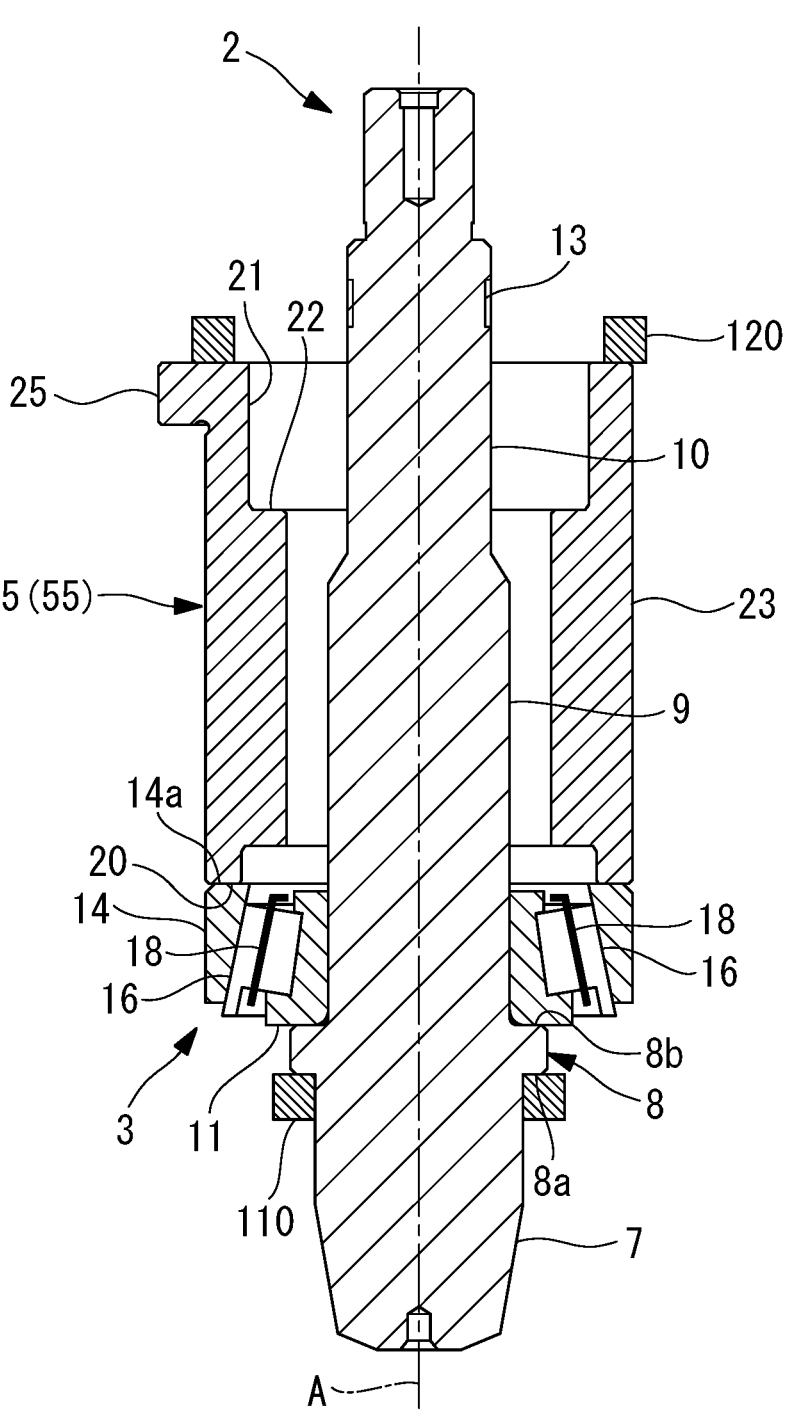
FIG. 21 is a longitudinal sectional view for explaining another example of the manufacturing method of the present disclosure.

Note that, in the individual embodiments mentioned above, the circumferential groove 24 or the notch 51 is provided in the outer circumferential surface 23 of the spacer 5, 55, so that it is possible to keep applying the external force for maintaining the contact state between the rollers 16 and the outer ring 14 of the first conical roller bearing 3 until a preload is applied. As an alternative method for manufacturing the combined conical roller bearing unit 1, 50, the claw part 120 of the hand 100 may be hooked on an end face of the spacer 5, 55 on the side opposite the first abutting surface 20, as shown in FIG. 21. With this method also, it is possible to keep applying the external force for maintaining the contact state between the rollers 16 and the outer ring 14 of the first conical roller bearing 3 until a preload is applied.

In addition, although the claw part 110 of the hand 100 is hooked on one end face 8a of the flange part 8 of the shaft

2 in the abovementioned embodiments, alternatively, the claw part 110 may be hooked on an end face of the shaft 2. In addition, although the shaft 2 having the gear 7 at one end thereof has been illustrated as an example of the shaft 2 constituting the combined conical roller bearing unit 1, 50, the shaft 2 is not limited thereto, and any other shaft may be adopted.

The invention claimed is:

1. A combined conical roller bearing unit comprising:
 a shaft having a stepped part at one portion in a direction along a longitudinal axis, the stepped part extending in a direction orthogonal to the longitudinal axis;
 a first conical roller bearing having a first inner ring to which the shaft is fitted and which abuts the stepped part in the direction along the longitudinal axis;
 a spacer having an abutting surface that abuts, from a side opposite the stepped part in the direction along the longitudinal axis, a first outer ring of the first conical roller bearing;
 a second conical roller bearing having a second outer ring that sandwiches the spacer between the first outer ring and the second outer ring, and a second inner ring to which an outer surface of the shaft is fitted; and
 a pressing member that is attached to the shaft and that presses the second inner ring in a direction to approach the first inner ring,
 wherein the spacer includes at least one recess which is recessed in the direction orthogonal to the longitudinal axis in at least a portion of an outer surface of the spacer,
 wherein the at least one recess is configured to receive an external force for applying a force in the direction along the longitudinal axis to the first outer ring from the spacer side,
 wherein the stepped part is configured to receive an external force for applying a force in the direction along the longitudinal axis to the first inner ring from the stepped part side,
 wherein the at least one recess comprises a plurality of recesses, and
 wherein the plurality of recesses are spaced apart in a circumferential direction about the longitudinal axis.

2. The combined conical roller bearing unit according to claim 1, wherein the plurality of recesses are notches formed by cutting out the abutting surface.

3. The combined conical roller bearing unit according to claim 1, wherein an outer diameter of the first outer ring is larger than an outer diameter of the second outer ring.

4. The combined conical roller bearing unit according to claim 3, wherein the spacer includes an outer circumferential surface that has an outer diameter equal to the outer diameter of the first outer ring, an inner circumferential surface that has an inner diameter equal to the outer diameter of the second outer ring, and a stepped part against which an end face of the second outer ring on the first outer ring side is abutted.

5. A method for manufacturing a combined conical roller bearing unit by using a robot, a hand with two claws being mounted on the robot, the method comprising:
 fitting a shaft having a stepped part at one portion in a direction along a longitudinal axis to a first inner ring of a first conical roller bearing, the stepped part extending in a direction orthogonal to the longitudinal axis, and inserting the shaft to a position at which the first inner ring abuts the stepped part in the direction along the longitudinal axis;

abutting an abutting surface of a spacer, from a side opposite the stepped part in the direction along the longitudinal axis, on a first outer ring of the first conical roller bearing;

bringing one of the two claws into contact with the stepped part and bringing the other of the two claws into contact with a recess, the recess being recessed in the direction orthogonal to the longitudinal axis in at least a portion of an outer surface of the spacer;

in a state in which, by moving the two claws toward each other, a force in the direction along the longitudinal axis is applied to the first outer ring from the spacer side and a force in the direction along the longitudinal axis is applied to the first inner ring from the stepped part side, fitting the shaft to a second inner ring of a second conical roller bearing, and inserting the shaft to a position at which the spacer is sandwiched in the direction along the longitudinal axis between a second outer ring of the second conical roller bearing and the first outer ring; and pressing, by means of a pressing member attached to the shaft, the second inner ring in a direction to approach the first inner ring.

6. The method for manufacturing a combined conical roller bearing unit according to claim 5, wherein the external force that has been applied to the first outer ring is released after a preload is applied to the first conical roller bearing by means of the pressing member.

7. A method for manufacturing a combined conical roller bearing unit, the method comprising:

fitting a shaft having a stepped part at one portion in a direction along a longitudinal axis to a first inner ring of a first conical roller bearing, the stepped part extending in a direction orthogonal to the longitudinal axis, and inserting the shaft to a position at which the first inner ring abuts the stepped part in the direction along the longitudinal axis;

abutting an abutting surface of a spacer, from a side opposite the stepped part in the direction along the longitudinal axis, on a first outer ring of the first conical roller bearing;

in a state of applying a force in the direction along the longitudinal axis to the first outer ring from the spacer side and applying a force in the direction along the longitudinal axis to the first inner ring from the stepped part side, fitting the shaft to a second inner ring of a second conical roller bearing, and inserting the shaft to a position at which the spacer is sandwiched in the direction along the longitudinal axis between a second outer ring of the second conical roller bearing and the first outer ring; and pressing, by means of a pressing member attached to the shaft, the second inner ring in a direction to approach the first inner ring, wherein the external force that has been applied to the first outer ring is released after a preload is applied to the first conical roller bearing by means of the pressing member.

* * * * *